United States Patent
Popescu et al.

(10) Patent No.: US 11,448,136 B2
(45) Date of Patent: Sep. 20, 2022

(54) ADAPTIVE AIRCRAFT ELECTRICAL POWER DISTRIBUTION SYSTEM

(71) Applicant: HONEYWELL INTERNATIONAL INC., Morris Plains, NJ (US)

(72) Inventors: Michael Popescu, Phoenix, AZ (US); Murali Mohan Talapureddi, Bangalore (IN); Jeffrey Sloat, Phoenix, AZ (US); Kevin Dittmar, Phoenix, AZ (US); Leticia Montes, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 244 days.

(21) Appl. No.: 16/850,518

(22) Filed: Apr. 16, 2020

(65) Prior Publication Data

US 2021/0324803 A1  Oct. 21, 2021

(51) Int. Cl.
*F02C 7/36* (2006.01)
*H04W 4/48* (2018.01)
(Continued)

(52) U.S. Cl.
CPC .............. *F02C 7/36* (2013.01); *B64D 27/14* (2013.01); *B64D 41/00* (2013.01); *B64F 1/36* (2013.01);
(Continued)

(58) Field of Classification Search
CPC .... H02J 2310/44; H02J 4/00; B64D 2221/00; B64D 41/00; B64F 1/36
See application file for complete search history.

(56) References Cited

U.S. PATENT DOCUMENTS 5,612,579 A  3/1997  Wisbey et al.
5,659,243 A  8/1997  Smith
(Continued)

FOREIGN PATENT DOCUMENTS

| CN | 205150248 U | 4/2016 |
| WO | 9834318 A1 | 8/1998 |
| WO | 2011097156 A2 | 8/2011 |

OTHER PUBLICATIONS

PR Newswire, "U.S. Army Unveils MP Hybrid Vehicle Platform at SAE 2005 Congress," PR Newswire [New York] Apr. 11, 2005: 1.
(Continued)

*Primary Examiner* — Ryan Johnson
(74) *Attorney, Agent, or Firm* — Lorenz & Kopf, LLP

(57) ABSTRACT

An adaptive aircraft electrical power distribution system includes an aircraft power source, a power connector, an aircraft power distribution bus, and a bidirectional power controller. The aircraft power source is operable to generate and supply electrical power. The power connector is mounted on a fuselage of the aircraft. The aircraft power distribution bus is operable to distribute electrical power to an aircraft electrical load. The bidirectional power controller is mounted in the aircraft and is electrically coupled to the aircraft power source, the aircraft power connector, and the aircraft power distribution bus. The bidirectional power controller is configured to: sense when the aircraft power source is generating and supplying electrical power, sense when electrical power is being supplied to the power connector from an external power source, and selectively couple at least one of the aircraft power source or the power connector to the aircraft power distribution system.

18 Claims, 4 Drawing Sheets

(51) Int. Cl.
    *B64D 27/14*     (2006.01)
    *B64F 1/36*     (2017.01)
    *B64D 41/00*     (2006.01)

(52) U.S. Cl.
    CPC ........... *H04W 4/48* (2018.02); *B64D 2221/00* (2013.01); *H02J 2310/44* (2020.01)

(56) References Cited

U.S. PATENT DOCUMENTS

| | | |
|---|---|---|
| 5,697,810 A | 12/1997 | Barry |
| 5,729,059 A * | 3/1998 | Kilroy ................. H02J 3/42 307/64 |
| 5,813,630 A | 9/1998 | Williams |
| 7,367,193 B1 | 5/2008 | Thompson |
| 7,682,198 B1 | 3/2010 | Plattner |
| 8,026,632 B2 | 9/2011 | Cook et al. |
| 8,294,285 B2 | 10/2012 | Hunter |
| 8,294,286 B2 | 10/2012 | Hunter |
| 9,327,600 B1 | 5/2016 | Nehmeh |
| 10,093,250 B2 | 10/2018 | White et al. |
| 10,173,784 B2 | 1/2019 | Stewart et al. |
| 10,363,823 B2 | 7/2019 | Li et al. |
| 10,381,833 B2 | 8/2019 | Eddins et al. |
| 2004/0140673 A1 * | 7/2004 | McCool ................. B64F 1/36 290/1 R |
| 2006/0061213 A1 | 3/2006 | Michalko |
| 2010/0300117 A1 | 12/2010 | Moulebhar |
| 2014/0060589 A1 * | 3/2014 | Nordlund ................. B64F 5/30 307/151 |

OTHER PUBLICATIONS

Siuru, Bill. "Advanced Military Vehicles Keep Rolling Along," Diesel Progress North American Edition, 71.6: 116(3). Diesel & Gas Turbine Publications, Jun. 2005.

Godarzi, A., "Local and Global Optimization of Exportable Vehicle Power Based Smart Microgrid," 2011 IEEE PES Innovative Smart Grid Technologies (ISGT 2011), p. 7.

Luiz Andrade et al. "Design of the Boeing 777 Electric System" Proceedings of the Internationla Aerospace and Electronics Conference, vol. 3, 1994, pp. 1281-1290, Dayton, XP000339853.

* cited by examiner

ADAPTIVE AIRCRAFT ELECTRICAL POWER DISTRIBUTION SYSTEM

TECHNICAL FIELD

The present invention generally relates to aircraft electrical power generation, and more particularly relates to an adaptive aircraft electrical power distribution system that allows aircraft power sources to supply electrical power to loads that are external to the aircraft.

BACKGROUND

Many aircraft, including both fixed-wing and rotary aircraft, are equipped with one or more auxiliary power sources such as, for example, one or more auxiliary power units (APUs) or one or more relatively smaller micro power units (mPUs). Most APUs and mPUs function, among other things, to generate and supply electrical power to the aircraft electrical load without having to run the main engines or connecting to an external ground power system. This reduces main engine wear, and concomitantly main engine maintenance, and also provides the added benefit of lower operational fuel costs.

Currently, many aircraft are configured to allow external power source systems to supply electrical power to the aircraft. However, most aircraft are not configured to allow the APUs and/or mPUs to supply electrical power to loads that are external to the aircraft.

Hence, there is a need for a system and method that allows aircraft power sources to supply electrical power to loads that are external to the aircraft and for external power sources to supply electrical power to the aircraft. This disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an adaptive aircraft electrical power distribution system includes an aircraft power source, a power connector, an aircraft power distribution bus, and a bidirectional power controller. The aircraft power source is disposed within an aircraft and is operable to generate and supply electrical power. The power connector is mounted on a fuselage of the aircraft. The aircraft power distribution bus is disposed within the aircraft and operable to distribute electrical power to an aircraft electrical load. The bidirectional power controller is mounted in the aircraft and is electrically coupled to the aircraft power source, the aircraft power connector, and the aircraft power distribution bus. The bidirectional power controller is configured to: sense when the aircraft power source is generating and supplying electrical power, sense when electrical power is being supplied to the power connector from an external power source, and selectively couple at least one of the aircraft power source or the power connector to the aircraft power distribution system.

In another embodiment, an adaptive aircraft electrical power distribution system includes an engine generator, a power connector, an aircraft power distribution bus, and a bidirectional power controller. The engine generator is disposed within an aircraft and is operable to generate and supply electrical power. The power connector is mounted on a fuselage of the aircraft. The aircraft power distribution bus is disposed within the aircraft and is operable to distribute electrical power to an aircraft electrical load. The bidirectional power controller is mounted in the aircraft and is electrically coupled to the engine generator, the aircraft power connector, and the aircraft power distribution bus. The bidirectional power controller configured to: sense when the engine generator is generating and supplying electrical power, sense when electrical power is being supplied to the power connector from an external power source, electrically couple the engine generator to the power connector when (i) the engine generator is generating and supplying electrical power and (ii) electrical power is not being supplied to the power connector from an external power source, electrically couple the power connector to the aircraft power distribution system when (i) the engine generator is not generating and supplying electrical power and (ii) electrical power is being supplied to the power connector from an external power source, and electrically couple the power connector to the aircraft power distribution system when (i) the engine generator is generating and supplying electrical power and (ii) electrical power is simultaneously being supplied to the power connector from an external power source.

In yet another embodiment, an aircraft includes a fuselage, an engine generator, a power connector, an aircraft power distribution system, and a bidirectional power controller. The engine generator is disposed within the fuselage and is operable to generate and supply electrical power. The power connector is mounted on the fuselage. The aircraft power distribution bus is disposed within the fuselage and is operable to distribute electrical power to an aircraft electrical load. The bidirectional power controller is mounted within the fuselage and is electrically coupled to the engine generator, the aircraft power connector, and the aircraft power distribution bus. The bidirectional power controller configured to: sense when the engine generator is generating and supplying electrical power, sense when electrical power is being supplied to the power connector from an external power source, electrically couple the engine generator to the power connector when (i) the engine generator is generating and supplying electrical power and (ii) electrical power is not being supplied to the power connector from an external power source, electrically couple the power connector to the aircraft power distribution system when (i) the engine generator is not generating and supplying electrical power and (ii) electrical power is being supplied to the power connector from an external power source, and electrically couple the power connector to the aircraft power distribution system when (i) the engine generator is generating and supplying electrical power and (ii) electrical power is simultaneously being supplied to the power connector from an external power source.

Furthermore, other desirable features and characteristics of the adaptive aircraft electrical power distribution system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
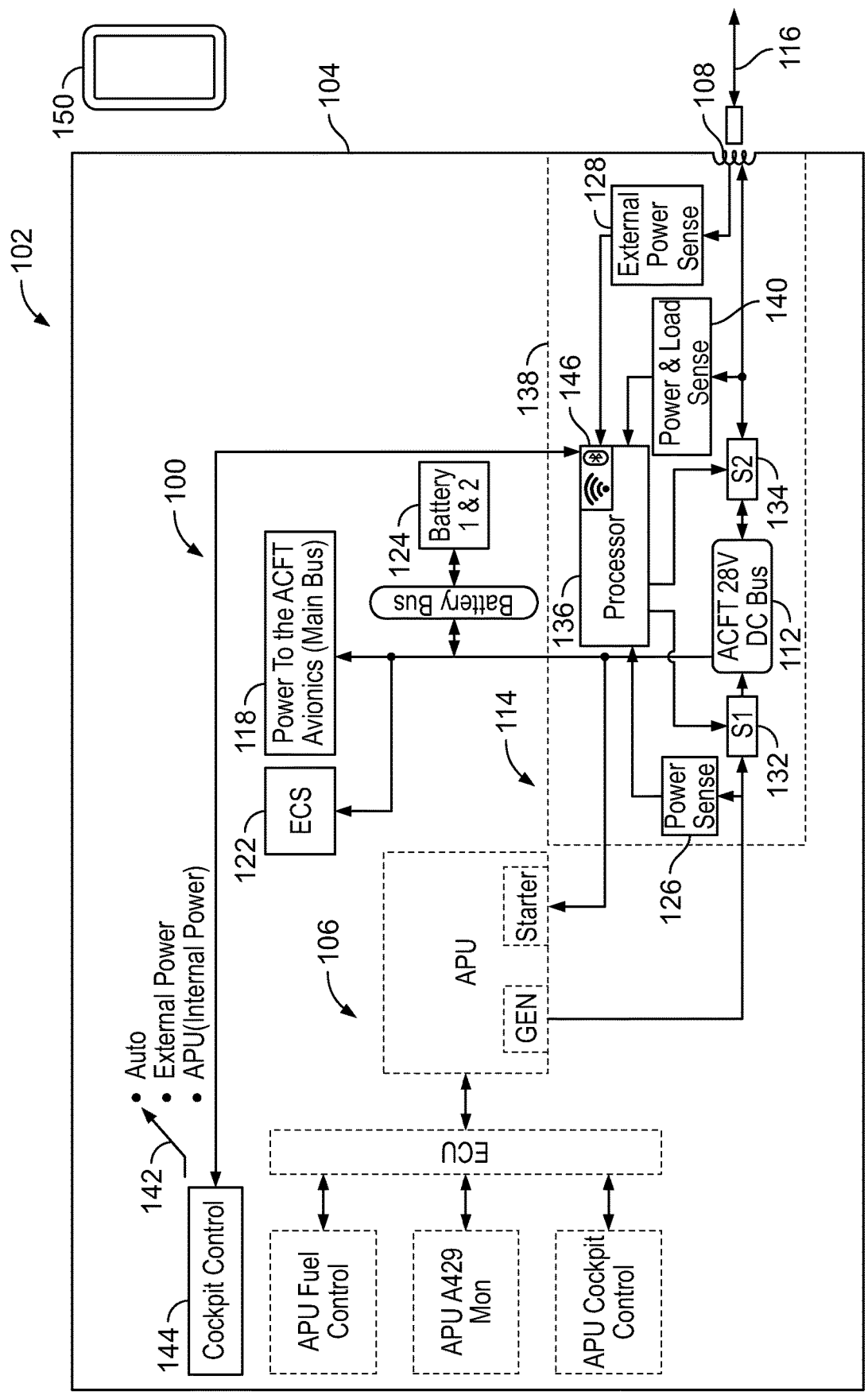
FIG. 1 depicts a functional block diagram of one embodiment of an adaptive aircraft electrical power distribution system.

Referring now to FIG. 1, a functional block diagram of one embodiment of an adaptive aircraft electrical power distribution system 100 is depicted. The system 100 is disposed within an aircraft 102, and more specifically within the fuselage 104 of the aircraft 102, and includes an aircraft power source 106, a power connector 108, an aircraft power distribution bus 112, and a bidirectional power controller 114. The aircraft power source 106 is disposed within the fuselage and is operable to generate and supply electrical power. The aircraft power source 106 may be variously implemented. In the depicted embodiment it is implemented as an auxiliary power unit (APU) and its associated controls. In other embodiments, however, it may be implemented as any one of numerous other known power generators, such as a micro power unit (mPU).

The power connector 108 is mounted on, and extends through, the fuselage 104 of the aircraft 102. The power connector 108 is adapted to connect to an external power cable 116. As will be described momentarily, the power cable 116 may receive power from an external power source 202 (see FIG. 2) or supply power to one or more external power loads 302 (see FIG. 3).

The aircraft power distribution bus 112 is operable to distribute electrical power to the aircraft electrical load based on aircraft system demand. The electrical load may fluctuate depending, for example, on which aircraft systems are being powered. Some examples of aircraft power systems include, but are not limited to, the aircraft avionics 118, at least portions of the aircraft environmental control system 122, and other non-illustrated electrical systems. In the depicted embodiment, the aircraft power distribution bus 112 is a 28 VDC power distribution bus, which is standard for most aircraft electrical generation systems. However, the system described herein allows for both AC or DC buses, as needed or desired by the end application.

The bidirectional power controller 114 is mounted in the aircraft 102 and is electrically coupled to the aircraft power source 106, the aircraft power connector 108, and the aircraft power distribution bus 112. The bidirectional power controller 114 is configured to sense when the aircraft power source 106 is generating and supplying electrical power, and sense when electrical power is being supplied to the power connector 108 from an external power source 202. The bidirectional power controller 114 is also configured to selectively couple at least one of the aircraft power source 106 or the power connector 108 to the aircraft power distribution system 112.

Figure 2:
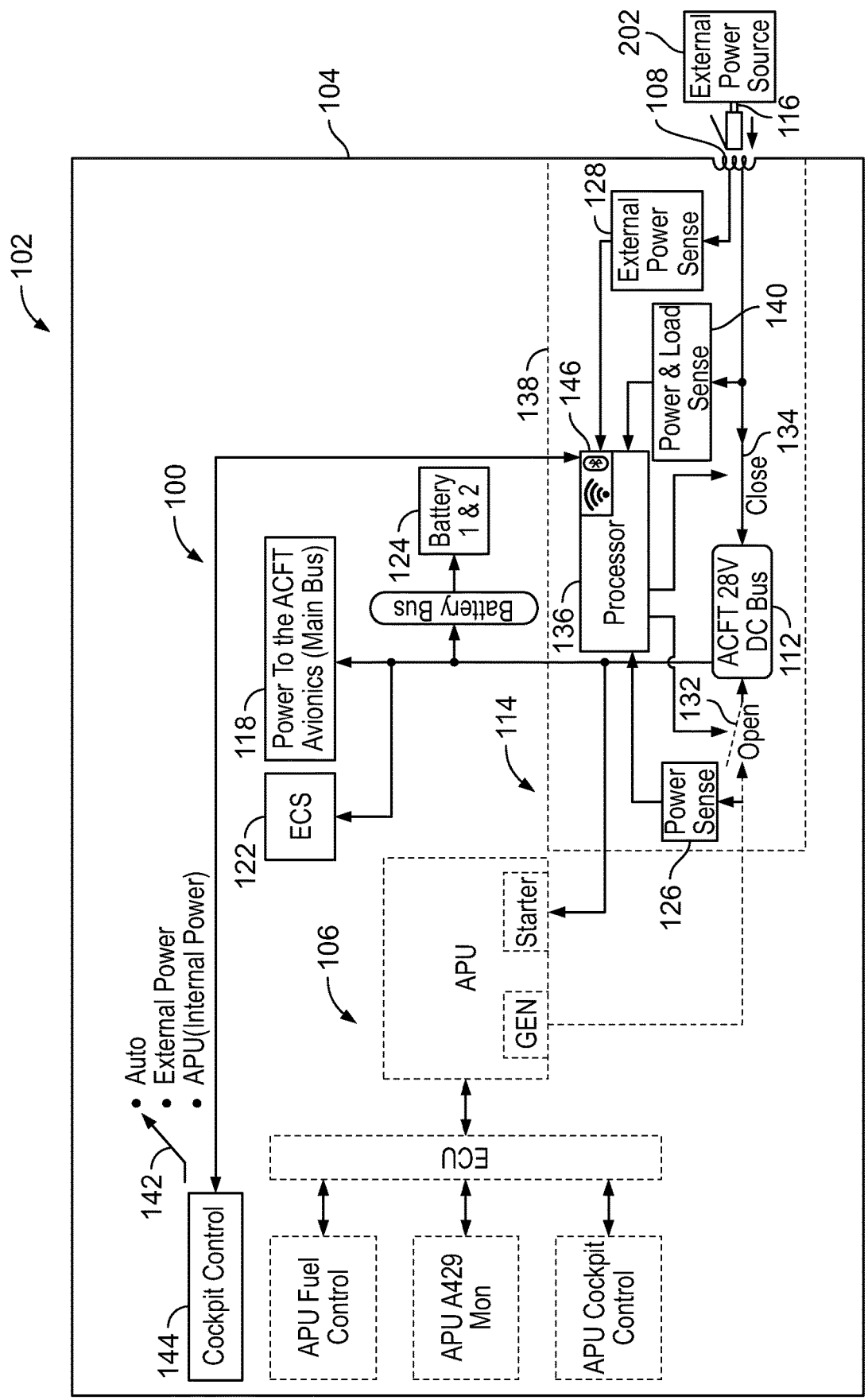
FIG. 2 depicts the system of FIG. 1 in a first operational configuration.
Figure 3:
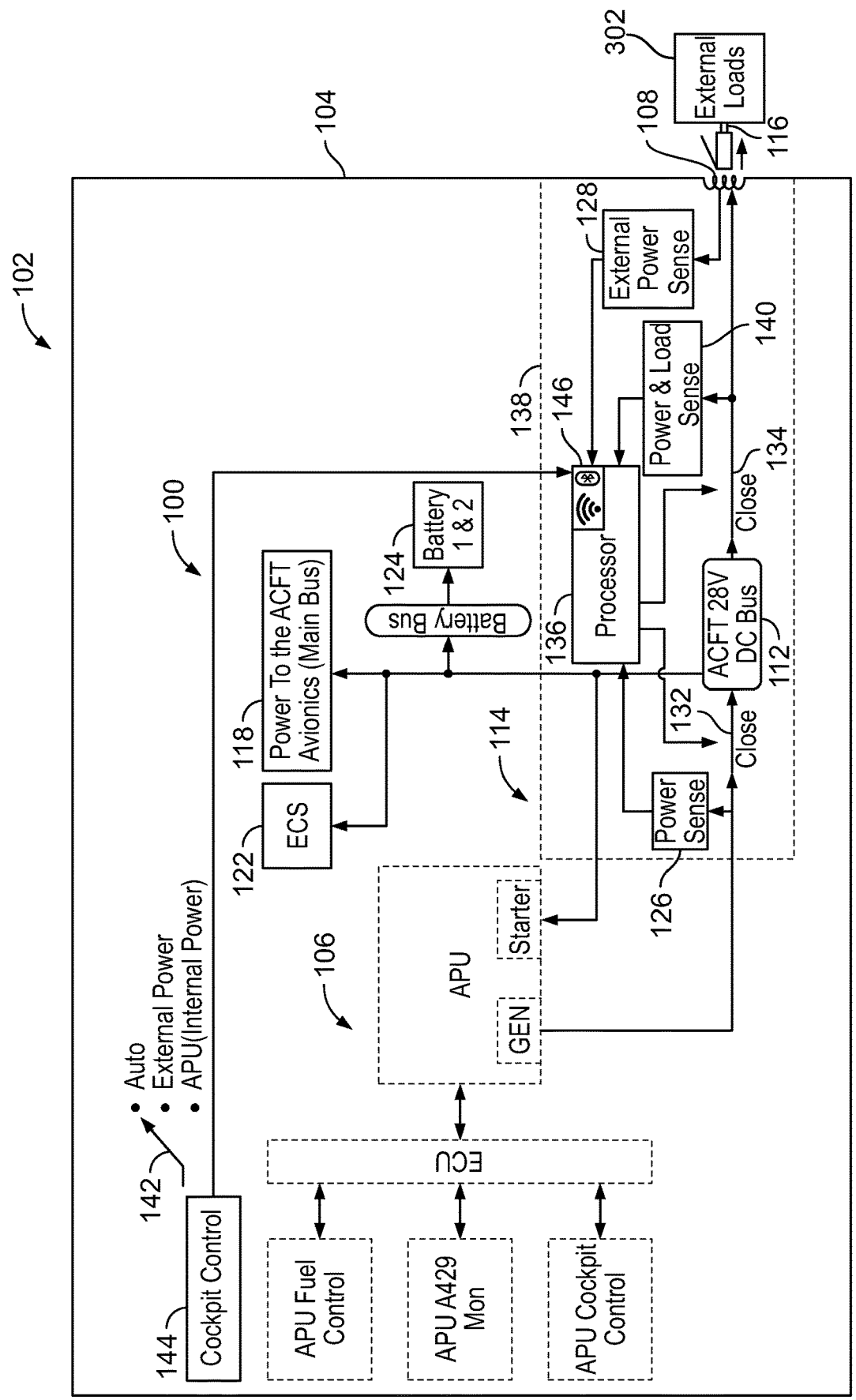
FIG. 3 depicts the system of FIG. 1 in a second operational configuration.

Generally, though not always, the bidirectional controller 114 will electrically couple the power connector 108 to the aircraft power distribution system 112 when electrical power is being supplied to the power connector 108 from an external power source 202, and electrically couple the aircraft power source 106 to the aircraft power distribution system 112 when the aircraft power source 106 is generating and supplying electrical power. More specifically, as depicted in FIG. 2, the bidirectional power controller 114 is configured to electrically couple the power connector 108 to the aircraft power distribution system 112 when electrical power is being supplied to the power connector 108 from an external power source 202 and the aircraft power source 106 is not generating and supplying electrical power. And, as depicted in FIG. 3, the bidirectional power controller 114 is configured to electrically couple the aircraft power source 106 to the aircraft power distribution system 112 when the aircraft power source 106 is generating and supplying electrical power and electrical power is not being supplied to the power connector 108 from an external power source 202, but may instead be supplied to the one or more external power loads 302. Moreover, as FIG. 4 further depicts, the bidirectional power controller 114 is configured to electrically couple the power connector 108 to the aircraft power distribution system 112 when the aircraft power source 106 is generating and supplying electrical power and electrical power is simultaneously being supplied to the power connector 108 from an external power source 202.

To implement the above-described functionality, it is seen in FIGS. 1-4 that the bidirectional power controller 114 includes at least an aircraft power sensor 126, and external power sensor 128, a first controllable switch 132, a second controllable switch 134, and a processor 136, all of which are preferably (but not necessarily) disposed within a common housing 138. The aircraft power sensor 126 is electrically coupled to the output of the aircraft power source 106 and is in operable communication with the processor 136. The aircraft power sensor 126 is operable to sense when the aircraft power source 106 is generating and supplying electrical power and to at least supply a signal representative thereof to processor 136. The external power sensor 128 is electrically coupled to the power connector 108 and is also in operable communication with the processor 136. The external power sensor 128 is operable to sense when electrical power is being supplied to the power connector 108 from an external power source 202 and to at least supply a signal representative thereof to processor 136. It will be appreciated that the aircraft power sensor 126 and the external power sensor 128 may be implemented using any one of numerous known electrical power sensors, which may measure one or more electric power characteristics, such as voltage, current, and power. Some examples of known power sensors include Hall Effect sensors, inductive sensors, and direct measurement sensors, just to name a few.

The first and second controllable switches 132, 134 are each in operable communication with the processor 136 and are each responsive to switch commands supplied from the processor 136 to move between an open position and a closed position. It will be appreciated that the first and second controllable switches 132, 134 may be implemented using anyone of numerous known command-responsive switching devices. Some non-limiting examples include any one of numerous types of semiconductor switches, optical switches, and electromechanical switches (e.g., relays).

No matter the specific type of switches used, the first controllable switch 132 is electrically coupled between the aircraft power source 106 and the aircraft power distribution system 112, and the second controllable switch 134 is electrically coupled between the power connector 108 and the aircraft power distribution system 112. Thus, when the first controllable switch 132 is in the open position, the aircraft power source 106 is electrically disconnected from the aircraft power distribution system 112. Conversely, when the first controllable switch 132 is in the closed position, the aircraft power source 106 is electrically coupled to the aircraft power distribution system 112. Similarly, when the second controllable switch 134 is in the open position, the power connector 108 is electrically disconnected from the aircraft power distribution system 112. Conversely, when the second controllable switch 134 is in the closed position, the power connector 108 is electrically coupled to the aircraft power distribution system 112.

Figure 4:
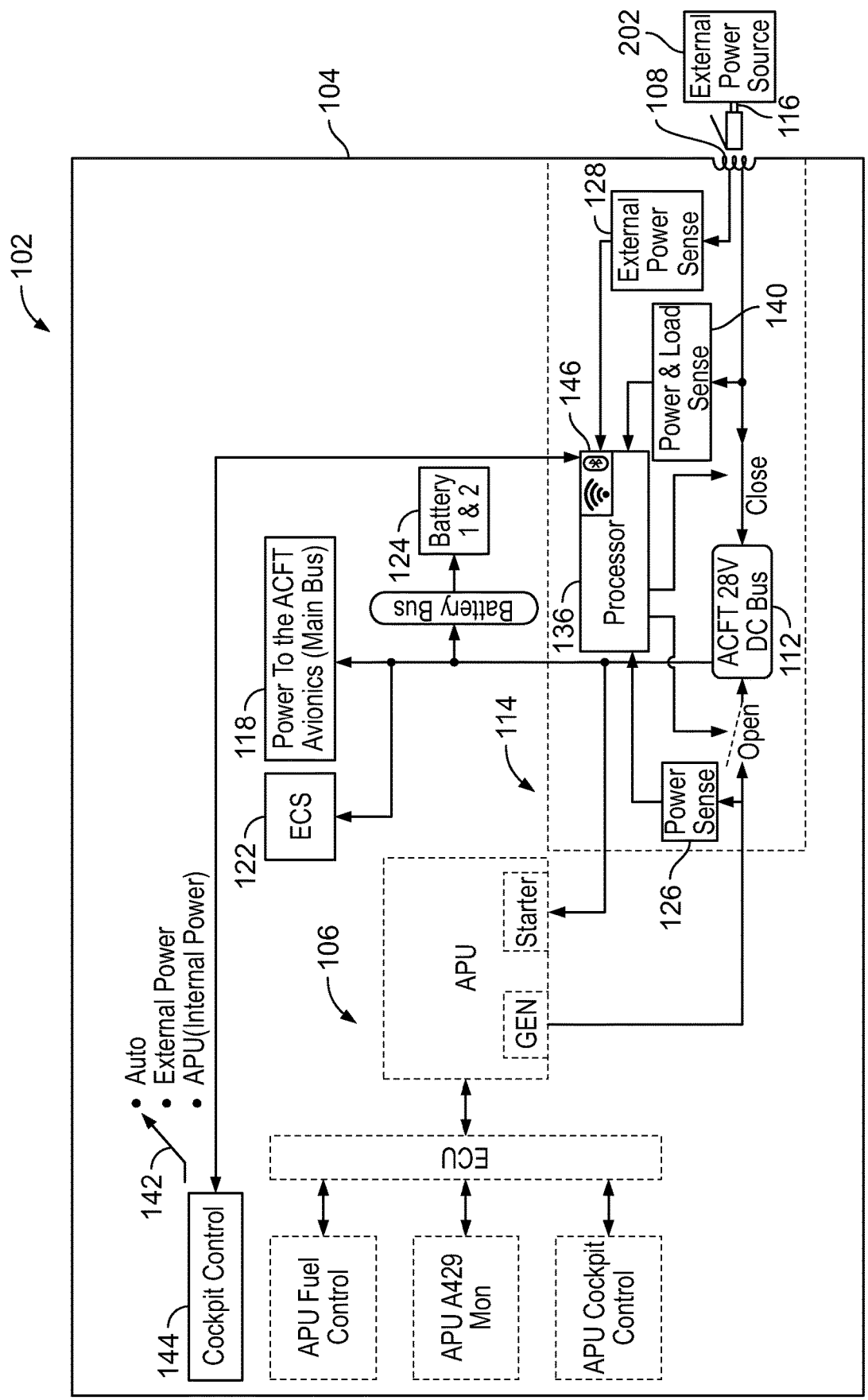
FIG. 4 depicts the system of FIG. 1 in a third operational configuration.

The processor 136, as noted above, is in operable communication with the aircraft power sensor 126, the external power sensor 128, the first controllable switch 132, and the second controllable switch 134. The processor 136 is configured to be responsive to the signals supplied from the aircraft power sensor 126 and the external power sensor 128 to command either or both of the first and second controllable switches 132, 134 to the open or closed positions, to thereby the selectively couple either the aircraft power source 106 or the power connector 108 to the aircraft power distribution system 112. For example, and as noted above, when the aircraft power sensor 126 and the external power sensor 128 supply signals indicating that electrical power is being supplied to the power connector 108 from an external power source 202 and that the aircraft power source 106 is not generating and supplying electrical power, the processor 136 will command the first controllable switch 132 to its open position and the second controllable switch 134 to its closed position (FIG. 2). When the aircraft power sensor 126 and the external power sensor 128 supply signals indicating that the aircraft power source 106 is generating and supplying electrical power and electrical power is not being supplied to the power connector 108 from an external power source 202, the processor 136 will command the first controllable switch 132 to its closed position and the second controllable switch 134 to its closed position (FIG. 3). And when the aircraft power sensor 126 and the external power sensor 128 supply signals indicating that the aircraft power source 106 is generating and supplying electrical power and electrical power is simultaneously being supplied to the power connector 108 from an external power source 202, the processor 136 will command the first controllable switch 132 to its open position and the second controllable switch 134 to its closed position (FIG. 4). This latter functionality ensures that power from the external power source 202 takes priority over the aircraft power source 106 when both are supplying electrical power to the aircraft 102.

It will be appreciated that the processor 136 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

Before proceeding further, it is noted that the depicted bidirectional power controller 114 also includes a load power sensor 140. This sensor 140, when included, is electrically coupled between the power connector 108 and the aircraft power distribution system 112, and is operable to sense the power being supplied from the aircraft power source 106 to any external power loads 302. The load power sensor 140 is also in operable communication with the processor 136 and supplies a signal to the processor 136 that is representative of the power being supplied to any external power loads 302.

The functionality of the bidirectional power controller 114 has thus far been described as implementing automatic control. It may be desirable, however, to provide the system 100 with manual control. In such cases, for example, the system 100 may additionally include a control switch 142. The control switch 142, when included, is preferably disposed remotely from the bidirectional power controller 114, such as in the aircraft cockpit 144, and is in operable communication with the bidirectional power controller 114. The control switch 142 is movable to a first position, a second position, and a third position, which, at least in the depicted embodiment, correspond to Auto, External Power, and Internal Power, respectively.

In the first (or Auto) position, the bidirectional power controller 114 automatically operates, as described above, to couple at least one of aircraft power source 106 or the power connector 108 to the aircraft power distribution system 112. In the second (or External Power) position, the bidirectional power controller 114 couples the power connector 108 to the aircraft power distribution system 112. In the third (or Internal Power) position, the bidirectional power controller 114 couples the aircraft power source 106 to the aircraft power distribution system 112.

The bidirectional power controller 114 may also, in some embodiments, include a wireless transceiver 146. The wireless transceiver 146 may be part of the processor 136 itself, or it may be implemented as a separate device that is in operable communication with the processor 136. Regardless, it is operable to allow the bidirectional power controller 114 to wirelessly connect with, and wirelessly communicate with, a remote device 150, such as a smartphone, a tablet, or any one of numerous other hand-held devices. The wireless transceiver 146 could implement any one of numerous wireless communication protocols including, but not limited to, Bluetooth®, WiFi, or ZigBee.

In some embodiments, an application (or "app") may be downloaded to the remote device 150 allowing the remoted device 150 to communicate with, and potentially control, the bidirectional power controller 114 via a graphical user interface (GUI). The processor 136 and/or wireless transceiver 146 may also, in some embodiments, implement wireless communication encryption protocols and access control authentication methods. Some non-limiting examples of the authentication methods may include one or more of: a) something you have (e.g. smartphone), b) something you know (e.g. personal identification number, or PIN), and/or c) a personal characteristic of the user (e.g. biometric input such as a fingerprint). Including this capability could provide several benefits. Some benefits include preventing unauthorized access to the system 100, allowing the connected application to measure and report the power being provided, providing power use limitations to protect the batteries 124 and the aircraft power source 106 should the loads become a problem, and providing a record of power connector usage (e.g., date, time, power used, peak power used, length of connection, users of the power, etc.

In still other embodiments, the app on the remote device 150 could allow the remote device 150 to transmit, via the wireless communication, various commands to the bidirectional power controller 114. The commands could include commanding the bidirectional power controller 114 to selectively couple at least one of the aircraft power source 106 or the power connector 108 to the aircraft power distribution system 112. The commands could also include, for example, commands to start and/or stop the aircraft power source 106. This functionality could be implemented without any user authentication, or with user authentication and confirmation that one or more safety-related cross-checks have been satisfied. Some examples of these cross-checks include, but are not limited to, aircraft weight on wheels detected, aircraft ground speed is zero knots, aircraft position (e.g. latitude and longitude) is within a predetermined "safe-distance" to the authorized remote device 150, and a safe-to-start interlock detected.

The app on the remote device 150 may also, in some embodiments, enable the remote device 150 to scan and read a unique identifier, such as a bar-code, QR code, etc., on the power cable 116. Such functionality could be useful to control and record the power cable 116 being connected and help ensure that only approved power cables are connected to the power connector 108. The scanning and reading functionality of unique identifiers may also enable the ability to "gate" the power to the power connector 108 aircraft. In some embodiments, the power cable 116 could be implemented with a "smart voltage convertor" to provide different voltages (e.g. 115 Vac, 28 Vdc, 5 Vdc, etc.).

In still other embodiments, the information transmitted from the bidirectional power controller 114 to the remote device 150 could include various operational parameters that could be selectively viewed by flight crew or maintenance personnel. Some non-limiting examples of the operational parameters include: adaptive aircraft power distribution system status, adaptive aircraft power distribution system health, adaptive aircraft power distribution system faults, power supplied to external loads, power supplied to the aircraft power distribution system, peak power used by the aircraft power distribution system, time that electrical power is being supplied to the power connector from an external power source, time that the aircraft power source is generating and supplying electrical power, and any other historical power usage information that can be used for analytics or maintenance.

The system described herein readily allows aircraft power sources to supply electrical power to loads that are external to the aircraft and for external power sources to supply electrical power to the aircraft. This allows aircraft electrical power sources to supply electrical power to, for example, ground mission systems, medical staging areas, troop encampments, and remote power cells, just to name a few. The system described herein also enables aircraft electrical power sources on one aircraft to supply electrical power to another aircraft that may have experienced a battery drain.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An adaptive aircraft electrical power distribution system, comprising:
   an aircraft power source disposed within an aircraft, the aircraft power source operable to generate and supply electrical power;
   a power connector mounted on a fuselage of the aircraft;
   an aircraft power distribution bus disposed within the aircraft and operable to distribute electrical power to an aircraft electrical load; and
   a bidirectional power controller mounted in the aircraft and electrically coupled to the aircraft power source, the aircraft power connector, and the aircraft power distribution bus, the bidirectional power controller configured to:
   sense when the aircraft power source is generating and supplying electrical power,
   sense when electrical power is being supplied to the power connector from an external power source,
   electrically couple the power connector to the aircraft power distribution system when electrical power is being supplied to the power connector from an external power source, and
   electrically couple the aircraft power source to the power connector when (i) the aircraft power source is generating and supplying electrical power and (ii) electrical power is not being supplied to the power connector from an external power source.

2. The system of claim 1, wherein the bidirectional power controller is further configured to electrically couple the power connector to the aircraft power distribution system when (i) the aircraft power source is generating and supplying electrical power and (ii) electrical power is simultaneously being supplied to the power connector from an external power source.

3. The system of claim 1, further comprising:
   a control switch disposed remotely from, and in operable communication with, the bidirectional power controller, the control switch movable to a first position, a second position, and a third position,
   wherein:

in the first position, the bidirectional power controller automatically couples at least one of the aircraft power source or the power connector to the aircraft power distribution system, in the second position, the bidirectional power controller couples the power connector to the aircraft power distribution system, and in the third position, the bidirectional power controller couples the aircraft power source to the aircraft power distribution system.

4. The system of claim 3, wherein the control switch is disposed in a cockpit of the aircraft.

5. The system of claim 1, wherein the bidirectional power controller includes a wireless transceiver that is operable to wirelessly connect with a remote device to thereby wirelessly communicate with the remote device.

6. The system of claim 5, wherein the bidirectional power controller is further configured, upon wirelessly connecting with the remote device, to transmit information to, and receive information from, the remote device.

7. The system of claim 6, wherein the information transmitted from the bidirectional power controller to the remote device includes one or more of: adaptive aircraft power distribution system status, adaptive aircraft power distribution system health, adaptive aircraft power distribution system faults, power supplied to external loads, power supplied to the aircraft power distribution system, peak power used by the aircraft power distribution system, time that electrical power is being supplied to the power connector from an external power source, and time that the aircraft power source is generating and supplying electrical power.

8. The system of claim 6, wherein
the information transmitted from the remote device to the bidirectional power controller includes at least one or more commands; and
the bidirectional power controller is responsive to the one or more commands to selectively couple at least one of the aircraft power source or the power connector to the aircraft power distribution system.

9. The system of claim 6, wherein the remote device is further configured to at least selectively implement a cable scanning function that verifies the cable meets at least one criterion.

10. The system of claim 1, wherein the aircraft power source is a gas turbine engine generator.

11. An adaptive aircraft electrical power distribution system, comprising:
an engine generator disposed within an aircraft, the engine generator operable to generate and supply electrical power;
a power connector mounted on a fuselage of the aircraft;
an aircraft power distribution bus disposed within the aircraft and operable to distribute electrical power to an aircraft electrical load; and
a bidirectional power controller mounted in the aircraft and electrically coupled to the engine generator, the aircraft power connector, and the aircraft power distribution bus, the bidirectional power controller configured to:
sense when the engine generator is generating and supplying electrical power,
sense when electrical power is being supplied to the power connector from an external power source,
electrically couple the engine generator to the power connector when (i) the engine generator is generating and supplying electrical power and (ii) electrical power is not being supplied to the power connector from an external power source,
electrically couple the power connector to the aircraft power distribution system when (i) the engine generator is not generating and supplying electrical power and (ii) electrical power is being supplied to the power connector from an external power source, and
electrically couple the power connector to the aircraft power distribution system when (i) the engine generator is generating and supplying electrical power and (ii) electrical power is simultaneously being supplied to the power connector from an external power source.

12. The system of claim 11, further comprising:
a control switch disposed in a cockpit of the aircraft and in operable communication with the bidirectional power controller, the control switch movable to a first position, a second position, and a third position,
wherein:
in the first position, the bidirectional power controller automatically couples at least one of the aircraft power source or the power connector to the aircraft power distribution system,
in the second position, the bidirectional power controller couples the power connector to the aircraft power distribution system, and
in the third position, the bidirectional power controller couples the aircraft power source to the aircraft power distribution system.

13. The system of claim 11, wherein:
the bidirectional power controller includes a wireless transceiver that is operable to wirelessly connect with a remote device to thereby wirelessly communicate with the remote device; and
the bidirectional power controller is further configured, upon wirelessly connecting with the remote device, to transmit information to, and receive information from, the remote device.

14. The system of claim 13, wherein:
the information transmitted from the bidirectional power controller to the remote device includes one or more of: adaptive aircraft power distribution system status, adaptive aircraft power distribution system health, adaptive aircraft power distribution system faults, power supplied to external loads, power supplied to the aircraft power distribution system, peak power used by the aircraft power distribution system, time that electrical power is being supplied to the power connector from an external power source, and time that the engine generator is generating and supplying electrical power;
the information transmitted from the remote device to the bidirectional power controller includes at least one or more commands; and
the bidirectional power controller is responsive to the one or more commands to selectively couple at least one of the engine generator or the power connector to the aircraft power distribution system.

15. The system of claim 11, wherein the remote device is further configured to at least selectively implement a cable scanning function that verifies the cable meets at least one criterion.

16. An aircraft, comprising:
a fuselage;
an engine generator disposed within the fuselage and operable to generate and supply electrical power;
a power connector mounted on the fuselage;

an aircraft power distribution bus disposed within the fuselage and operable to distribute electrical power to an aircraft electrical load; and a bidirectional power controller mounted within the fuselage and electrically coupled to the engine generator, the aircraft power connector, and the aircraft power distribution bus, the bidirectional power controller configured to:

sense when the engine generator is generating and supplying electrical power, sense when electrical power is being supplied to the power connector from an external power source, electrically couple the engine generator to the power connector when (i) the engine generator is generating and supplying electrical power and (ii) electrical power is not being supplied to the power connector from an external power source, electrically couple the power connector to the aircraft power distribution system when (i) the engine generator is not generating and supplying electrical power and (ii) electrical power is being supplied to the power connector from an external power source, and electrically couple the power connector to the aircraft power distribution system when (i) the engine generator is generating and supplying electrical power and (ii) electrical power is simultaneously being supplied to the power connector from an external power source.

17. The aircraft of claim 16, further comprising:

a cockpit disposed within the fuselage; and a control switch disposed in the aircraft cockpit and in operable communication with the bidirectional power controller, the control switch movable to a first position, a second position, and a third position, wherein:

in the first position, the bidirectional power controller automatically couples at least one of the aircraft power source or the power connector to the aircraft power distribution system, in the second position, the bidirectional power controller couples the power connector to the aircraft power distribution system, and in the third position, the bidirectional power controller couples the aircraft power source to the aircraft power distribution system.

18. The aircraft of claim 16, wherein:

the bidirectional power controller includes a wireless transceiver that is operable to wirelessly connect with a remote device to thereby wirelessly communicate with the remote device; and the bidirectional power controller is further configured, upon wirelessly connecting with the remote device, to transmit information to, and receive information from, the remote device.

* * * * *